Feb. 26, 1935.  E. W. WESCOTT  1,992,685
PRODUCTION OF FERRIC OXIDE BY BURNING FERRIC CHLORIDE
Filed June 22, 1928  5 Sheets-Sheet 1

Inventor
ERNEST W. WESCOTT,
By K. P. McElroy
Attorney

Feb. 26, 1935.  E. W. WESCOTT  1,992,685
PRODUCTION OF FERRIC OXIDE BY BURNING FERRIC CHLORIDE
Filed June 22, 1928    5 Sheets—Sheet 2

Inventor
E. W. Wescott
By K. P. McElroy
Attorney

Feb. 26, 1935. E. W. WESCOTT 1,992,685
PRODUCTION OF FERRIC OXIDE BY BURNING FERRIC CHLORIDE
Filed June 22, 1928 5 Sheets-Sheet 3

Inventor
*Ernest W. Wescott,*
By K. P. McElroy
Attorney

Feb. 26, 1935.  E. W. WESCOTT  1,992,685
PRODUCTION OF FERRIC OXIDE BY BURNING FERRIC CHLORIDE
Filed June 22, 1928  5 Sheets-Sheet 4

Inventor
Ernest W. Wescott,
By K. P. McElroy,
Attorney

Feb. 26, 1935. E. W. WESCOTT 1,992,685
PRODUCTION OF FERRIC OXIDE BY BURNING FERRIC CHLORIDE
Filed June 22, 1928 5 Sheets-Sheet 5

Inventor
Ernest. W. Wescott,
By
K. P. McElroy
Attorney

Patented Feb. 26, 1935

1,992,685

UNITED STATES PATENT OFFICE 1,992,685

PRODUCTION OF FERRIC OXIDE BY BURNING FERRIC CHLORIDE

Ernest W. Wescott, Niagara Falls, N. Y., assignor, by mesne assignments, to Sulphur and Smelting Corporation, Dover, Del., a corporation of Delaware Application June 22, 1928, Serial No. 287,566

19 Claims. (Cl. 23—200)

This invention relates to burning ferric chloride; and it comprises a method of producing chlorine and iron oxide from ferric chloride wherein ferric chloride vapors are burned in a suitable reaction chamber with preheated oxygen or air at such temperatures and under such conditions of heat input as to produce quick settling, coarsely crystalline iron oxide and chlorine. The invention further comprises a method such as above described wherein ferric chloride is heated under sufficient pressure to permit liquefaction and the formation of a body of vapors of uniform temperature for supply to the reaction chamber, and in which heat is transferred from the chlorine outflowing from the reaction chamber to inflowing air in a suitable heat exchanger system. More specifically, the invention includes the method above described wherein the temperature in the reaction zone and the rate of heat input thereto are maintained such as is requisite to insure production of coarsely crystalline iron oxide by supplying, in addition to the heat introduced by way of the ferric chloride vapors and the heated air, heat from an extraneous source, preferably by introducing and burning controlled amounts of producer gas, pulverized carbon, or similar fuel free from hydrogen, in the presence of the reacting ferric chloride vapors and air or oxygen in the reaction zone. Also, the pressure of the entering producer gas or other aeriform fuel may be used to balance pressure relations between the chlorine and the air flowing from the heat exchanger.

The invention also comprises as an organization of apparatus elements a ferric chloride vaporizer having means adapted to produce a slight super-atmospheric back pressure therein, a reaction chamber receiving vapors therefrom and having means for removing settled iron oxide at its base, means for introducing heated oxygen or air into said chamber adjacent the point of vapor inlet, means for introducing producer gas, such means advantageously operating as injecting means for the air, heat exchanger means for removing hot chlorine and exchanging its heat with ingoing air and means for introducing air into the settled iron oxide.

In a prior patent, No. 1,552,786, dated September 8, 1925, I have described and claimed a method of recovering pure iron oxide from iron ores containing the same wherein reduced iron ore is chlorinated to produce vapors of ferric chloride, reduction being prior to or simultaneous with chlorination. The vapors are condensed to recover ferric chloride from the accompanying gases, the ferric chloride is revaporized and the flowing vapors passed through a port or nozzle into a burner or reaction chamber, meeting and burning with a jet or flow of preheated air. The oxygen of the air combines with the iron, setting free chlorine and forming dense clouds of solid iron oxide. Under proper conditions, the reaction is quick and complete. In practice, it is usually desirable to simplify control by working with a trifling excess of air or ferric chloride vapor. This excess need not occur in substantial quantity and is ordinarily immaterial. The chlorine produced is diluted by the nitrogen of the air and the theoretical concentration (about 33 per cent) can be closely approached in operation. As regards the chlorine, the process is cyclic; the same body of chlorine serving to treat an indefinitely large amount of ore. In certain copending applications (Serial No. 181,497, filed April 6, 1927, now Patent No. 1,898,701 and Serial No. 254,805, filed February 16, 1928, now Patent No. 1,898,702) I describe and claim methods of producing pure sulfur (99.8 per cent) from pyrite and analogous ores and materials wherein sulfur in the ore is displaced by chlorine and the iron chlorinated; the displaced sulfur being distilled out of the ore as vapors passing away to a condenser at a relatively low temperature. In these methods, the ore iron finally appears as ferric chloride which is burnt in vapor form by air, as before, to produce iron oxide and reproduce dilute chlorine. The present invention relates to certain improvements in the methods of and apparatus for conducting the combustion of the vapors of ferric chloride, applicable to the patented process and in the recovery of iron in the methods of the copending applications.

Solid anhydrous ferric chloride with an adequate supply of heat vaporizes freely without melting under sea level atmospheric pressure (760 mm.) at about 310° to 325° C. Vaporization however is attended with the usual difficulties incident to supplying heat to a subliming solid. In the present invention where ferric chloride vapors are to be supplied from solid chloride, I have found that in order to obtain a regular delivery of uniform vapors of uniform temperature, it is better to effect vaporization under sufficient back pressure to produce liquefaction of the chloride. This liquid will then boil in a regular and uniform way. By using a vertical delivery pipe for the vapors say 30 feet high, the weight of the vapor column is sufficient to produce all the back pressure needed in most locations. It is simpler to use this type of back pressure where practicable, rather than use reducing valves and throttling means which may plug.

In burning a jet of ferric chloride vapor by a jet of hot air in a reaction chamber, to produce ignition and maintain the localized zone of intense combustion, the chamber walls should be maintained at a bright red heat. With a chamber well insulated against loss of heat, no difficulty is found in maintaining a steady high temperature in the chamber and steady and regular combustion. This temperature, as indicated by pyrometers in the path of the flame gases (chlorine and nitrogen) may be anywhere between 700° to 800° C., according to conditions. In this temperature range, the ferric oxide can be produced as a fine-grained, sometimes impalpable, powder. This form of ferric oxide is desirable for various technical purposes; as filler for plastic compositions and rubber, as a component of paints, etc. Its production is described in the acknowledged Patent No. 1,552,786. With an increase in temperature and in the rate of heat input, more rapid combustion takes place with quicker completion of the reaction in the localized burning zone. At temperatures above 800° C., say, around 850° to 900° C., and particularly in the presence of $CO_2$, the iron oxide is produced in a different form; as a coarsely crystalline, readily settling oxide, which collects in the form of interlocked crystal masses. In appearance it is a mossy, fernlike, friable aggregation of crystals which readily breaks up without much dusting into hard granular aggregates dull black in color and of an open, pervious texture due to interlocked crystals. This product shows a high degree of resistance to crushing to a fine powder. After having been subjected to the crushing test used in testing Mesabi ores for breakdown to dust, consisting in grinding in a porcelain mortar, the product showed less than 10% through a 20-mesh sieve. This test was conducted by an operator skilled in determining the dusting qualities of commercial iron ores and the degree of severity and length of time of the grinding were those customarily used in testing Mesabi ores. This relatively coarse material is better adapted than the finer oxide for open hearth and blast furnace purposes; and I contemplate its production in the present invention. At chamber temperatures of 830° C. and higher, this coarse crystalline oxide is regularly produced. Temperatures above 900° C. may be used, but are not necessary and are more difficult to maintain than temperatures between 830° and 900° C.

I find that the production of this coarsely crystalline oxide appears to be dependent not only upon the maintenance of the higher temperatures above mentioned, but also upon the rate of heat input, and that in order to maintain the temperature in the reaction zone within the desired range heat must be supplied at a greater rate than would be indicated by calculations taking into consideration merely the heat input requisite to compensate for normal heat losses, thus indicating that there may be an intermediate or secondary reaction in the formation of the coarsely crystalline oxide which is attended by the absorption of heat. However, I do not intend to be limited to any particular theory as to the formation of the coarsely crystalline oxide, and offer the above only as a possible explanation of what takes place and to emphasize that in carrying out the oxidizing reaction it is necessary to consider the reaction from the standpoint of heat input as well as of temperature.

While the oxidation of ferric chloride by air, considered as a reaction, is probably exothermic (develops heat), in practice heat must be supplied to the chamber to maintain the combustion and the temperature. The amount of heat which it is necessary to supply varies with conditions. Sometimes in the practice of the process described in the acknowledged copending application 254,805, the ferric chloride entering the burning chamber carries some nitrogen and in this event, the amount of heat to be supplied is somewhat greater. Using oxygen or enriched air, on the other hand, the amount of heat to be supplied is diminished. In one particular installation, using a well insulated brick reaction chamber of moderate size, supplied with inflowing ferric chloride vapors at 350°–400° C. and preheated air, I secured good and complete localized combustion with air supplied at 1050° C.

Because of the peculiarities of ferric chloride, it is difficult to furnish much superheat in its vapors. Vapors of ferric chloride at high temperatures tend to dissociate into ferrous chloride and free chlorine; the amount of dissociation, as usual, being a function of time, temperature and pressure. Attainment of dissociation equilibrium at any given pressure and temperature is however, rather slow and in any event, dissociation at temperatures below 500° C. is not an important factor. Solid ferrous chloride separates in dissociation. Superheat of the vapors to about 400° C. can be readily accomplished but heating above this point is somewhat difficult and particularly with a slow flow of vapors in roomy pipes and with the heat-transmitting walls at commercially practicable temperatures. Deposited ferrous chloride coats the wall and slows up transmission of heat. To secure efficient heating of the vapor to any temperature above 400° C., the heating members must be at a much higher temperature. It is in general more convenient to take the vapors at the temperature at which they leave the vaporizer, say, 325° to 400° C., and supply the balance of the necessary heat elsewhere.

With ferric chloride vapors at 325°–400° C., the rest of the heat required can be supplied as preheat of the air used; all of this preheat being furnished as fire heat in suitable stoves or tubular heaters. The monolithic recuperator of my prior Patent 1,657,704 is suitable, since leakage between fire gases and air is minimized. It is, however, more economical to derive at least part of the preheat from the hot outgoing chlorine coming from the oxidizing apparatus. With an efficient heat-exchanger system, the air may be thus heated to nearly the temperature of the outgoing gases (chlorine) leaving but little preheat to be added by stoves. This, however, involves two air-heating systems and adds to the difficulty in keeping the air pure.

Instead of heating in two stages, as just described, I find it simpler to introduce additional heat at the point of combustion from an extraneous source together with the heated air coming from the exchanger. While this additional heat may be supplied in various ways, a preferred and convenient way is to supply a controlled amount of a gaseous or pulverized fuel free from hydrogen or other element tending to cause untoward side reactions, and to burn such fuel with a portion of the heated air, directly at, or in close proximity to the reaction or combustion zone. A fuel which is particularly adapted for the purpose intended, is producer gas, either specially prepared or purified to insure that no hydrogen is introduced therewith. Retort carbon or a similar solid carbonaceous fuel in pulverized form and free from hydrogen may also be used. Apart from temperature considerations, the presence of the $CO_2$ resulting from the combustion of the introduced fuel appears to favor the production of coarsely crystalline iron oxide. The amount of producer gas or other suitable fuel required for the present purposes varies with the installation; depending on the radiation and other heat losses, the efficiency of the exchanger, the amount of nitrogen (if any) going in with the ferric chloride and that going in with the air, the temperature of the gas, etc. With one particular installation using a recuperator to exchange heat between the outgoing dilute chlorine and the incoming air, I have found the use of 4 or 5 per cent of CO (as producer gas) was desirable. A suitable gas was obtained by providing an updraft gas producer with a double take-off, dry or hydrogen-free gases being withdrawn at a low level, and gases containing hydrogen being withdrawn at another and higher level. The latter gas was used for supplying heat for vaporizing ferric chloride. The producer gas sent in with the air was dry; that is, was free of moisture, hydrogen and methane, or other hydrocarbons. The presence of hydrogen in any form leads to a loss of chlorine from the system; something which is highly undesirable in the cyclic systems referred to ante. For similar reasons, the air used in burning the ferric chloride should be as dry as possible. In damp climates artificial drying by refrigeration, by adsorbent checkers, etc., is often worth while.

The producer gas is preferably supplied hot. By supplying it under pressure through a sort of injector at the point of air inlet, pressures throughout the heat exchanger system are balanced in an advantageous way, preventing any great pressure differential at any point between the air and chlorine in the parallel passages, and thereby reducing leakage.

The burning reaction, as stated, is quantitative and neither the air nor ferric chloride need be used in excess. Chlorine, substantially free of oxygen and ferric chloride vapors, is readily secured. It however generally carries dust iron oxide, and it is advisable to use a heat exchanger of a vertical, readily cleaned type. Dust traps are advisable. In producing coarse oxide, much less dust is carried forward than in making the finer forms. Coarse iron oxide produced settles readily to the bottom of the reaction chamber, whence it can be removed by mechanical conveyors. In order to prevent access of the gases of the reaction chamber to the conveyor elements, it is advisable to provide a slight slow upward feed of moisture-free air through the accumulated oxide.

In burning pure ferric chloride vapor with air, production of gas having a maximum chlorine concentration of about 33 per cent is theoretically practicable; and this figure is closely approached in practice. With pure oxygen, pure chlorine can be obtained; but for the purposes of the acknowledged applications, and particularly Serial No. 254,805, the use of air is more advantageous. In cyclic systems, such as described in both applications, the dilute chlorine obtained with air is more desirable, since it permits volatilization of sulfur at lower temperatures. When producer gas or other suitable fuel is employed, the chlorine is somewhat more dilute; the amount of dilution depending upon the amount of producer gas or other fuel. In the processes of the acknowledged applications, a dilute chlorine is desired and the extra dilution obtained in using producer gas or other fuel is advantageous. In the cyclic processes of the copending applications, I sometimes desire chlorine concentrations as low as 20 per cent.

Apparatus within the present invention and useful in practicing the described process is illustrated in the accompanying drawings, wherein.

The burner apparatus, or oxidizer, as a whole, consists of an enclosed structure of concrete, firebrick and steel, having vertical walls 20 and 21 and internally divided into a number of compartments by curtain walls 22, 23, 24, etc. The compartment formed by the walls 20 and 22 is the reaction chamber 25, wherein ferric chloride is burnt to ferric oxide with liberation of chlorine. Adjacent the chamber 25, and communicating therewith by means of a passage 26 formed in the lower portion of the wall 22, is a settling chamber 27, wherein much of the ferric oxide is deposited. Wall 23 divides the chamber 27 into two portions, or sub-chambers, being spaced at its upper end from the roof 28 of the chamber, and serving as a baffle wall lengthening the path of the outgoing gases. The wall 24 permits open communication at its lower end, as indicated by the reference numeral 29, with flue 31, whence gases flow through a manifold 32 into a heat exchanger, referred to generally by the reference numeral 33, which is limited by the outer wall 21. The flow of gases through the oxidizer is indicated by the broken line and arrows, while the location of the deposited ferric oxide is indicated by the irregular line 34.

Associated with and forming a part of the apparatus just described are means to admit ferric chloride in the form of a vapor under superatmospheric pressure, means to admit hot air, means to admit producer gas and means to remove the deposited ferric oxide.

The ferric chloride admission system comprises a vaporizer, not shown, wherein solid ferric chloride is converted first into liquid and then into vapor, by heating at a temperature of about 350° C. under a slightly increased pressure, that is, under a pressure slightly in excess of 760 mm. of mercury. Heating in this manner is desirable to give regular development of vapor and good utilization of heat. The necessary excess pressure is obtained by positioning the vaporizer, which may be any suitable retort, some 30 to 50 feet below the top of the oxidizer, and leading the vapors of ferric chloride upwardly through a connecting pipe line 36, extending from the vaporizer to the top of the oxidizer, into which vapors are delivered by a pipe 37. The weight of the vertical column of vapor in the pipe 36 gives an increase of pressure in the vaporizer. The delivered vapors enter at the top of the reaction chamber 25 where they contact and burn with hot air simultaneously introduced.

In the apparatus as illustrated, exchange of heat between outgoing gas and incoming air is effected in a regenerator having twin chambers.

In one phase of operation of the heat exchanger, incoming air enters the system through a pipe 41 (see also Figs. 8 to 11), entering compartment 42 disposed beneath a plurality of rectangular tubes or channels in a body of refractory material adapted to store heat. This tube system forms half of the heat exchanger 33. The walls having been heated by outgoing chlorine in a previous phase, the incoming air becomes heated. It emerges into a chamber 44 disposed above the tubes 43, this chamber extending toward the curtain wall 24 of the oxidizer. The heated air passes through port 45 provided with a valve 46, which is now open, into chamber 47 which merges into a heat equalizer 48. As in exchanger 43, the tubular channels in the equalizer are smooth and rectangular, to minimize deposition of dust and facilitate cleaning. From the heat equalizer 48 hot air flows into the reaction chamber, there reacting with and burning ferric chloride vapor entering through the pipe 37.

Figure 8:
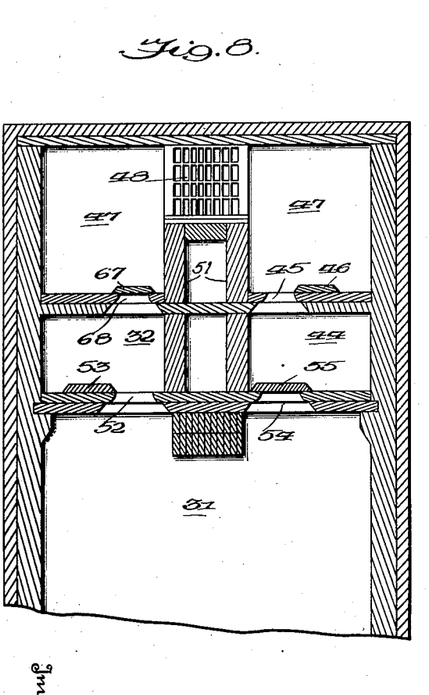
Figure 9:
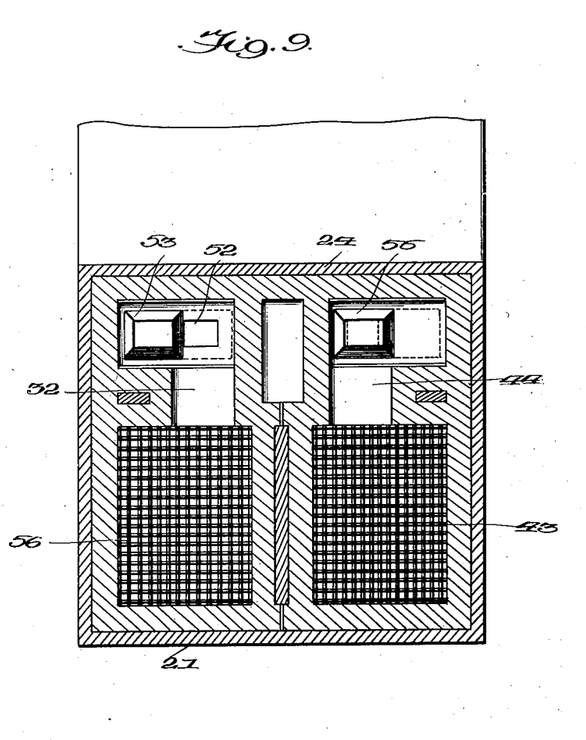
Figure 10:
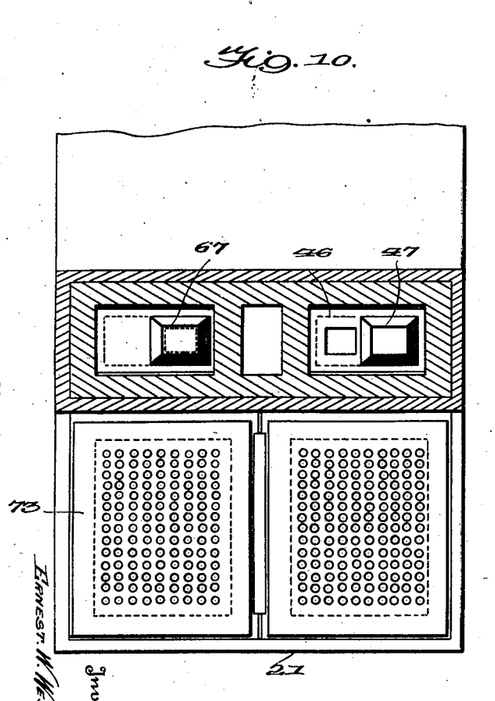

While hot air is thus flowing into the reaction zone, hot products of combustion (chlorine and nitrogen, etc.) flow from the reaction chamber 25, through settling chamber 27, and up flue 31. As best shown in Fig. 8, flue 31 extends under the chamber 44 through which the hot air is flowing, and also under a chamber 32, similar to chamber 44 and divided therefrom by walls 51. The exit gases enter chamber 32 through a port 52, valve 53 being open, but the exit gases cannot enter the chamber 44, port 54 thereof being closed by valve 55. The exit gases accordingly flow forward and down through rectangular passages 56, in all respects similar to the passages 43 through which air passes. The hot gases heat the walls thereof to a temperature higher in the upper portion and lower toward the bottom. The exit gases pass downwardly from the channels 56 into a chamber 57, whence they are removed and sent out of the system by a pipe line 58.

Figure 11:
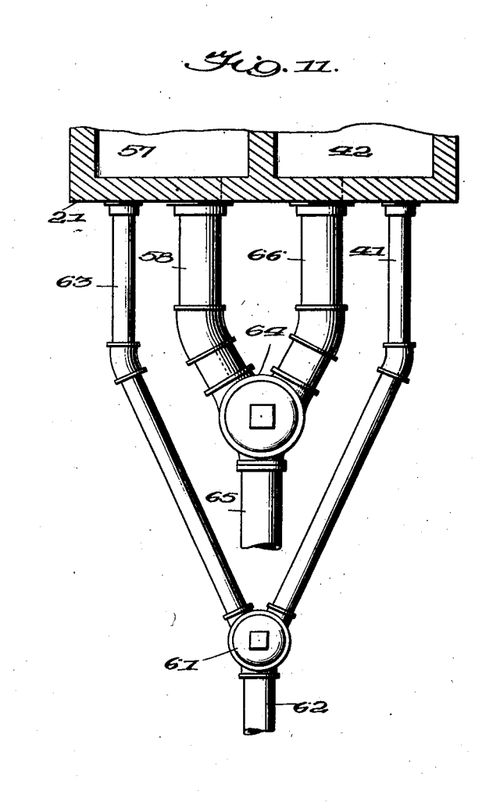
Fig. 11 is a fragmentary plan view of the piping arrangement employed in connection with the removal of chlorine and introduction of air.

At intervals the flows of entering air and of exit gases through the channels 43 and 56 are interchanged. As shown in Fig. 11, the pipe 41, by which air is admitted to chamber 42, is connected to a 2-way valve 61 provided with a branch 62 leading to a source of dry air (not shown) and with a branch 63, similar to branch 41, leading to chamber 57. By proper manipulation of valve 61, entering air may be admitted to either chamber 42 or 57. Similarly, exit pipe 58 is connected to a 2-way valve 64 provided with a delivery branch 65 and a branch 66 leading to the chamber 42, so that chlorine may be removed from chamber 42.

When air enters the system through the heat exchanger 56, it is heated by the heat absorbed by the walls during the previous flow of the hot exit gases. In order that heated air may flow to the equalizer 48, valve 53 is closed, thereby cutting off the exchanger 56 from the flue 31, and a valve 67, disposed above valve 53, is opened, thereby admitting the air into the chamber 47 through a port 68. Exit gases are directed into the exchanger 43 by opening the valve 55, thereby placing the chamber 44 in communication with the flue 31. Leakage into exchanger 48 is prevented by closing the valve 46. The exit gases now flow downwardly through channels 43 into chamber 42, and so on out of the system. When the walls of exchanger 43 have been heated and the walls of exchanger 56 cooled, the flow of air and exit gases is again interchanged, and the operation continues as first described.

Figures 1, 2:
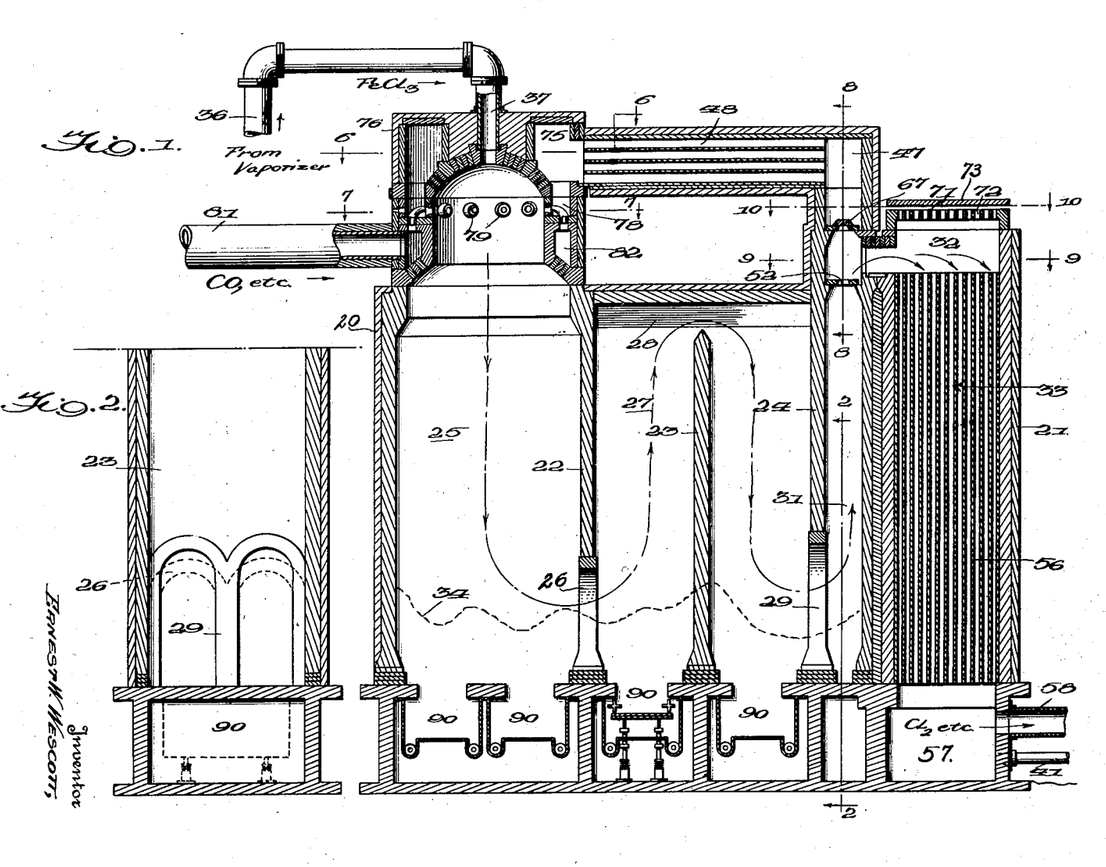
Fig. 1 is a longitudinal cross section of the apparatus, taken along line 1—1 of Fig. 5.
Fig. 2 is a transverse cross section taken along line 2—2 of Fig. 1.

The exit gases carry small quantities of dust which deposits in the passages in the heat exchanger and would eventually cause clogging. With passages rectangular in cross section less trouble is experienced than with circular cross section. Above channels 43 and 56 is a roof 71 provided with a plurality of holes 72 which are alined with the passages in the heat exchanger. When too much dust collects in any passage a cleaning instrument may be inserted through the corresponding hole, and the dust dislodged and sent to the chamber beneath the passages, from which it may be subsequently removed. During operation, a cover 73 (shown in Fig. 1 as slightly raised from its closed position) is disposed over the holes to prevent leakage.

The temperature of the air flowing through the heat exchanger 33 varies during each period of flow, being hotter at the beginning of a heating phase and less hot toward its end. It is desirable, however, to supply air to the burner at practically constant temperature, or within sufficiently close limits to insure regular operation. The described heat equalizer 48 serves to average out fluctuations in the temperature of the air going through it to the burner. The provision of this equalizer contributes greatly to regularity of operation in the burner with the type of heat interchanger shown. With heat exchangers of the type of a recuperator, which are sometimes used, the provision of a heat equalizer is less advantageous.

Figure 3:
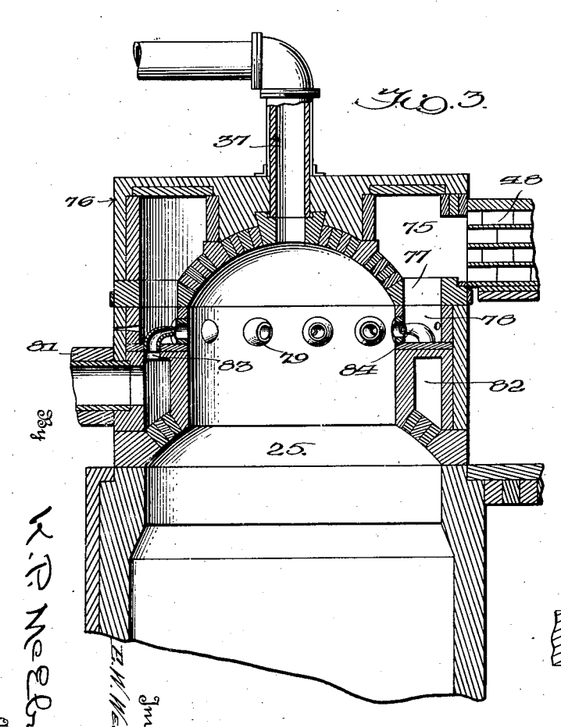
Fig. 3 is an enlarged fragmentary vertical cross section of the apparatus taken on line 3—3 of Fig. 7 and in the region of the combustion zone.
Figure 6:
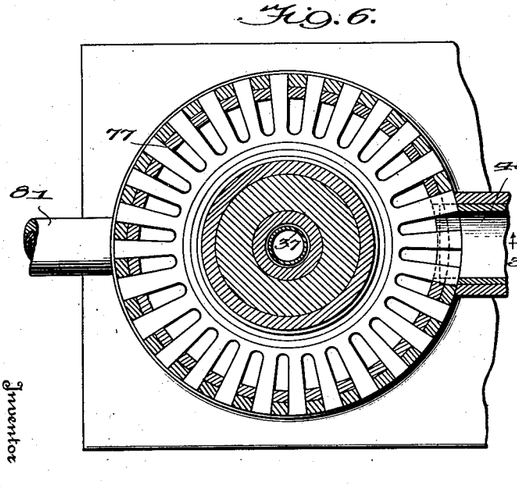
Figs. 6, 7, 8, 9 and 10 are cross sectional views taken, respectively, on lines 6—6 to 10—10 of Fig. 1.
Figure 7:
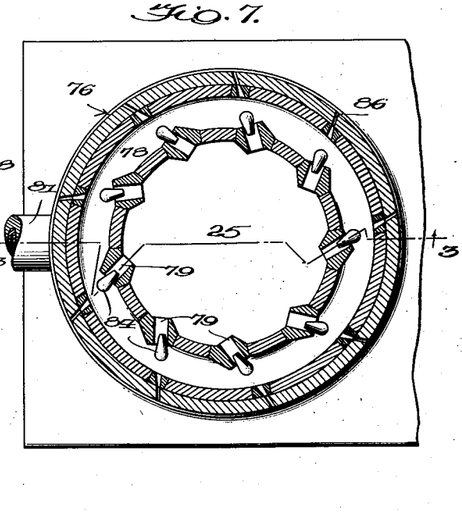

Heated air enters the oxidizer through a manifold 75 (see Figs. 3, 6 and 7), disposed within a dome 76 through the center of which passes pipe 37 for vapors of ferric chloride. Manifold 75 is disposed above an encircling and radially slotted wall 77 through which the air passes downwardly into an aspirating manifold 78. From this manifold hot air is sent into hot reaction chamber 25 as a plurality of jets by means of tangentially disposed ducts 79 through an injector action, exerted by producer gas under pressure also being discharged into the chamber 25. The gas is led to the oxidizer via conduit 81 and manifold 82, whence it passes upwardly through a plurality of ports 83 into nozzles 84 positioned in ducts 79 of aspirating chamber 78. The nozzles 84 are advantageously inclined tangentially to the wall of chamber 25 (see Fig. 7), so that the gases are discharged with a swirling action effecting rapid admixture of air and vapors. In passing through nozzles 84, the producer gas induces a flow of air from chamber 78 into chamber 25 by an injector action. It is advantageous to aspirate the air by means of the producer gas and thereby minimize pressure differences between outgoing chlorine and incoming air; lessening leakage tendencies past the valves separating the two. The tendency is to establish an equality of pressures on either side of the valves 53, 55, 46 and 67, with a corresponding freedom from leakage. Aspirating ducts 79 and nozzles 84 are also advantageously disposed tangentially to the wall of the chamber 25. By reference to Fig. 7, it will be understood that the compound jets of air and producer gas are projected inwardly from the wall of chamber 25, and contact with the downwardly flowing stream of ferric chloride vapor at the center of the chamber. As a result, there is developed a swirling action which facilitates the burning. The cloud of solid ferric oxide is formed centrally and falls to the bottom of the chamber, without much tendency to accumulate on the walls. Such ferric oxid as does settle around ducts 79 during long operation may be removed by means of a tool inserted through a special aperture 86 formed in the wall of dome 76. Falling ferric oxide accumulates at the bottom of chamber 25 as piles 34 out of the path of the chlorine which goes to flue 31 through port 52 and into the heat exchanger 56, as heretofore described. In many of the processes in which the dilute chlorine furnished by the oxidizer is used, it is not desired at any very high temperature, and for the sake of returning heat to the oxidizer and to avoid condensing traces of ferric chloride it may carry, I generally remove it from the burner system at about 260°–280° C. When no producer gas is used and the two draft currents sent to the burner are air and pure ferric chlorid vapor, the concentration of chlorine in the exit gases is about 34 per cent; the balance being mainly nitrogen. With the use of producer gas, the richness in chlorine is reduced. In either case, the dilute chlorine may be used in my acknowledged prior processes.

Special discharge mechanism is provided to remove deposited ferric oxide continuously but without inward leakage of atmospheric air containing moisture. This mechanism, referred to generally in Fig. 1 by the numeral 90, is shown in detail in Fig. 4.

Figure 4:
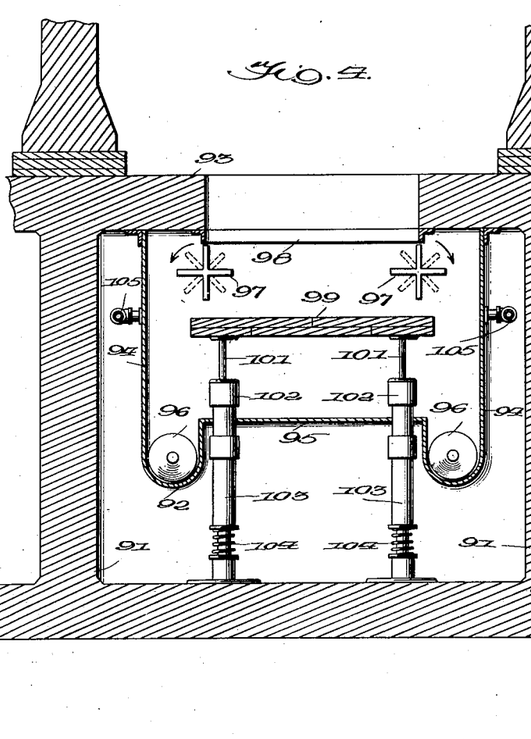
Fig. 4 is an enlarged fragmentary vertical cross section of the lower portion of the apparatus, showing the means for removing ferric oxide.
Figure 5:
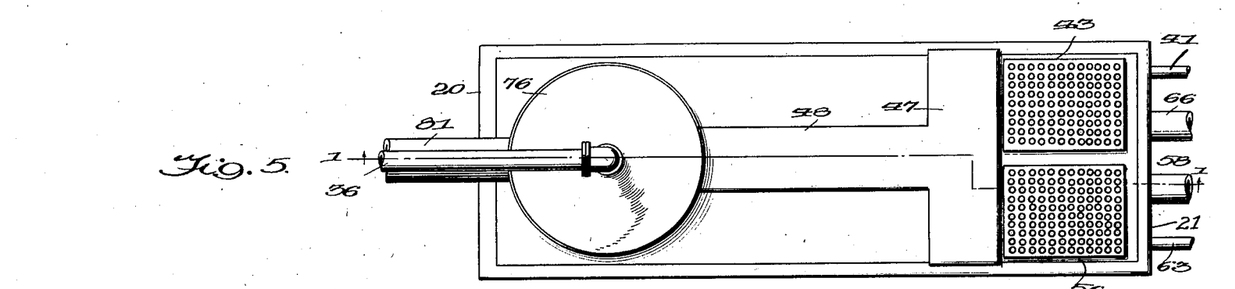
Fig. 5 is a top plan view of the apparatus.

In Fig. 4, between the foundation walls 91 supporting the walls of the oxidizer are positioned a plurality of air tight housings 92 secured to and suspended from the floor 93 of the oxidizer. These housings are practically coextensive with the depth of the oxidizer, and include a pair of vertically disposed side walls 94 and a bottom wall 95 adjacent which are mounted a pair of screw conveyors 96, suitably supported and rotated by means of mechanism not shown. Within the housing 92 and positioned just below and in alinement with the boundary walls of the floor 93 are a pair of rotatable star wheels 97 which are driven by suitable mechanism (not shown) in the directions indicated by arrows. The blades of the wheels are but slightly spaced from the lower edge of the floor 93 and almost contact with manganese steel wearing strips 98 which are provided to catch and crush any large crystalline masses of ferric oxide delivered by the star wheels.

Below star wheels 97 is a horizontally disposed table 99 covered with fire brick which is supported on I-beams 101 located between alined pedestals 102 and passing through wall 95 of housing 92. These pedestals are sealed at their point of passage to prevent ingress of air into the housing. At their lower ends they are telescopically mounted on pillars 103, resting on heavy coiled springs 104. The tension on the springs is so adjusted that the table 99 is always near the lower part of star wheels 97, the clearance being limited by the angle of repose of the crystals, so that material does not trickle through the space between star wheels 97 and table 99.

At any suitable point or points in the side walls 94 of the housing may be inserted gas pipes 105 through which a limited amount of dry air or inert gas is delivered into the housing. This gas moves upwardly, serving to displace entrapped chlorine in pile 34, and so prevents loss of chorine. Some of the dry air and inert gas is also carried out through screw conveyors 96, and so develops a pressure resisting any tendency for moist atmospheric air to leak in along the conveyors. In operation, star wheels 97 and conveyors 96 are rotated, thus delivering ferric oxide free from chlorine gas outside of the oxidizer.

While I have described the present invention more particularly with reference to its use for burning vapors of ferric chloride, it can be used equally well for burning ferrous chloride. In various modifications of my process of treating sulfid ores with chlorine, solid ferrous chloride is produced. Molten ferrous chloride can be sprayed into the oxidizer and burnt by a stream of hot air, or the solid chloride in a finely divided state simply blown in as a burning stream. Chlorine and coarsely crystalline iron oxides are produced as before. Ferrous chloride burns quite as readily as ferric chloride, although it is more difficult to vaporize. Where there is any object in heating ferric chloride vapors to a high temperature and it is practical so to do, or where ferric chloride vapor is produced at a high temperature, the dissociation mentioned ante does not interfere in any way with the operation of the oxidizer as long as the ferrous chloride produced is given no opportunity to deposit in a solid state. In the first stages of dissociation of ferric chloride vapor by heat, the ferrous chloride is produced as finely suspended particles in aerial suspension; and these particles will pass forward with the rest of the ferric chloride vapor. Such a cloudy vapor burns well; its high temperature facilitating combustion.

It is to be understood that wherever I refer to "ferric oxide" in the specification and claims I do not intend to be restricted to the precise composition $Fe_2O_3$ as the ratio of iron and oxygen in the oxide produced may vary somewhat from the definite chemical composition represented by the above-mentioned formula.

It will be understood, from the foregoing description, that I have provided a novel process of and apparatus for converting ferric chloride into ferric oxide with recovery of chlorine, and that various modifications may be made in the several steps of the process and that various structural changes may be made in the apparatus without departure from the spirit of the invention. For example, enriched air or oxygen may be employed in lieu of atmospheric air, and pure carbon monoxide or other hydrogen-free gaseous or pulverized fuel may be used in place of producer gas. Also, the reaction chamber, instead of being vertically disposed, may be disposed in a horizontal plane or at any desired inclination to the horizontal, and various other changes may be made in the various elements of the apparatus without affecting the principle of operation thereof or departing from the scope of the invention which is not to be deemed as limited other than as indicated by the appended claims.

What I claim is:—

1. A process of converting ferric chloride into ferric oxide by hot air with production of chlorine which comprises heating solid ferric chloride under pressures sufficiently great to insure liquefaction and regular production of vapors by ebullition of the same, contacting the vapors so produced with heated air in the presence of hydrogen-free producer gas to burn said vapors and produce chlorine and ferric oxide, with the ferric oxide in a coarsely crystalline state, the contact of vapors, air and producer gas being effected by introducing the air and producer gas as a stream angularly disposed to the vapors of ferric chloride, separating the ferric oxide from the gaseous reaction products, withdrawing the ferric oxide from the zone of reaction, freeing the withdrawn ferric oxide from entrapped gaseous products of reaction as it is withdrawn and transferring heat from the gaseous products of reaction to air to be used in oxidizing ferric chloride.

2. A process of converting ferric chloride into ferric oxide which comprises forming a body of vapors of ferric chloride and burning the same by supplying preheated air thereto from a plurality of angular directions with respect to the boundary of said body whereby rapid admixture of the vapors and air is obtained and a zone of active combustion of said vapors of ferric chloride is formed within said body to the substantial exclusion of active combustion at the boundaries thereof.

3. In a process of burning ferric chloride to produce ferric oxide and chlorine, the step which comprises burning a mixture of vapors of ferric chloride and a minor amount of hydrogen-free producer gas with preheated air.

4. In a process of burning ferric chloride to produce ferric oxide and chlorine, the steps which comprise forming vapors of ferric chloride, forcing producer gas into said vapors and burning said vapors and said gas with a flow of hot air induced by the flow of producer gas.

5. In a process of burning ferric chloride to produce ferric oxide and chlorine, a step comprising vaporizing ferric chloride at a pressure sufficiently great to ensure preliminary liquefaction and regular production of vapors and burning such vapors with hot air.

6. In the production of coarsely crystalline iron oxide from ferric chloride, the process which comprises burning a stream of ferric chloride vapor in a chamber at a temperature in excess of 830° C.

7. In the production of coarsely crystalline iron oxide from ferric chloride, the process which comprises burning a stream of ferric chloride vapor in a hot chamber by means of a stream of preheated air, exchanging heat between outgoing products of combustion and incoming air and further increasing the temperature of the reacting gases at the point of reaction by introduction of a modicum of fuel substantially free from hydrogen.

8. The process of producing coarsely crystalline iron oxide and dilute chlorine which comprises burning a stream of ferric chloride vapor at a temperature in excess of 830° C. by means of a stream of hot air.

9. In the burning of a stream of ferric chloride vapors by a stream of hot air for the production of solid iron oxide and dilute chlorine with heat exchange between outgoing chlorine and incoming air, the process of increasing the temperature in the zone of combustion and equalizing pressures through the heat exchanging system which comprises supplying a minor amount of dry producer gas under pressure at the point of air introduction.

10. A process of converting ferric chloride into ferric oxide which comprises bringing ferric chloride vapors into reactive relation with preheated air and supplying additional heat to the reaction zone in such amount and at such a rate as to maintain the temperature therein at at least 830° C. to cause the ferric oxide produced to assume a coarsely crystalline form.

11. A process of converting ferric chloride into ferric oxide which comprises vaporizing ferric chloride and preheating the vapors to above 325° C. and below 500° C., leading the thus preheated vapors into reactive relation with preheated air and supplying additional heat to the reaction zone by burning hydrogen-free carbonaceous fuel in said zone in sufficient amount to maintain the temperature therein at at least 830° C. and to cause the ferric oxide produced to assume a coarsely crystalline form.

12. A process of converting ferric chloride into ferric oxide which comprises introducing a stream of ferric chloride vapors longitudinally and centrally of an elongated reaction zone, impinging a plurality of streams of preheated air upon said vapor stream adjacent its point of introduction and separating the resulting oxide from the gaseous reaction products at a point remote from the points of introduction of the air and vapors.

13. A process of converting ferric chloride into ferric oxide which comprises introducing a stream of ferric chloride vapors longitudinally of an elongated reaction zone, impinging a plurality of streams of preheated air upon said vapor stream adjacent its point of introduction and continuously removing the resulting oxide and gaseous reaction products separately at points remote from the points of introduction of the air and vapors.

14. A process of converting iron chloride into ferric oxide which comprises introducing an iron chloride into a heated reaction zone in dispersed form and in reactive proximity to a stream of preheated air, the zone being at a sufficient temperature to initiate and maintain combustion of the chloride and supplying additional heat to the reaction zone in such amount and at such a rate as to maintain the temperature therein at at least 830° C. to cause the ferric oxide produced to assume a coarsely crystalline form.

15. A process of converting iron chloride into ferric oxide which comprises introducing an iron chloride into a heated reaction zone in dispersed form and in reactive proximity to a stream of preheated air, the zone being at a sufficient temperature to initiate and maintain combustion of the chloride and supplying additional heat by burning a hydrogen-free carbonaceous fuel in said zone in sufficient amount to maintain the temperature therein at at least 830° C. and to cause the ferric oxide produced to assume a coarsely crystalline form.

16. A process of converting iron chloride into ferric oxide which comprises introducing an iron chloride into a heated reaction zone in dispersed form and in reactive proximity to incoming preheated air, said air entering as a plurality of streams impinging on the body of introduced chloride and supplying additional heat to the reaction chamber in such amount and at such a rate as to maintain the temperature therein at at least 830° C. to cause the ferric oxide produced to assume a coarsely crystalline form.

17. A process of converting ferric chloride into ferric oxide by hot air with production of chlorine which comprises heating solid ferric chloride under such a pressure and at such a temperature that it becomes liquid and enters into regular ebullition and burning a current of the regular stream of vapors so produced with heated air to produce chlorine and ferric oxide while supplying sufficient heat to the reaction zone to maintain the temperature therein at such a point exceeding 800° C. as will insure the production of ferric oxide in coarsely crystalline, readily settling form.

18. A method of producing ferric oxide and chlorine from a chloride of iron by burning the chloride in a reaction chamber with preheated air or oxygen, in which the iron chloride in dispersed or vaporized form and in a preheated condition is burned with air or oxygen at a temperature exceeding 800° C. while supplying additional heat to the reaction zone in such amount and at such a rate as to insure the formation of coarsely crystalline iron oxide and its settling and collection in the form of interlocked crystal masses.

19. A process of converting ferric chloride into ferric oxide which comprises bringing ferric chloride vapors into reactive relation with preheated air and supplying additional heat to the reaction zone by burning a minor amount of hydrogen-free carbonaceous fuel in said zone, and so correlating the amount and preheat of the air, the preheat of the ferric chloride vapors and the amount of the hydrogen-free carbonaceous fuel as to maintain the temperature in said zone at at least 830° C. and to cause the ferric oxide produced to assume a coarsely crystalline form.

ERNEST W. WESCOTT.

CERTIFICATE OF CORRECTION.

Patent No. 1,992,685. February 26, 1935.

ERNEST W. WESCOTT.

It is hereby certified that error appears in the printed specification of the above numbered patent requiring correction as follows: Page 1, first column, line 7, for "quick" read quickly; page 5. second column, line 4, for "chorine" read chlorin; and page 6, second column, line 28, claim 13, after "longitudinally" insert the words and centrally; and that the said Letters Patent should be read with these corrections therein that the same may conform to the record of the case in the Patent Office.

Signed and sealed this 9th day of April, A. D. 1935.

(Seal)

Leslie Frazer
Acting Commissioner of Patents.